Oct. 28, 1924.                                               1,513,482
                        F. D. BROWN
         PNEUMATIC CLEANER FOR BEANS AND THE LIKE
              Filed March 20, 1924        3 Sheets-Sheet 3
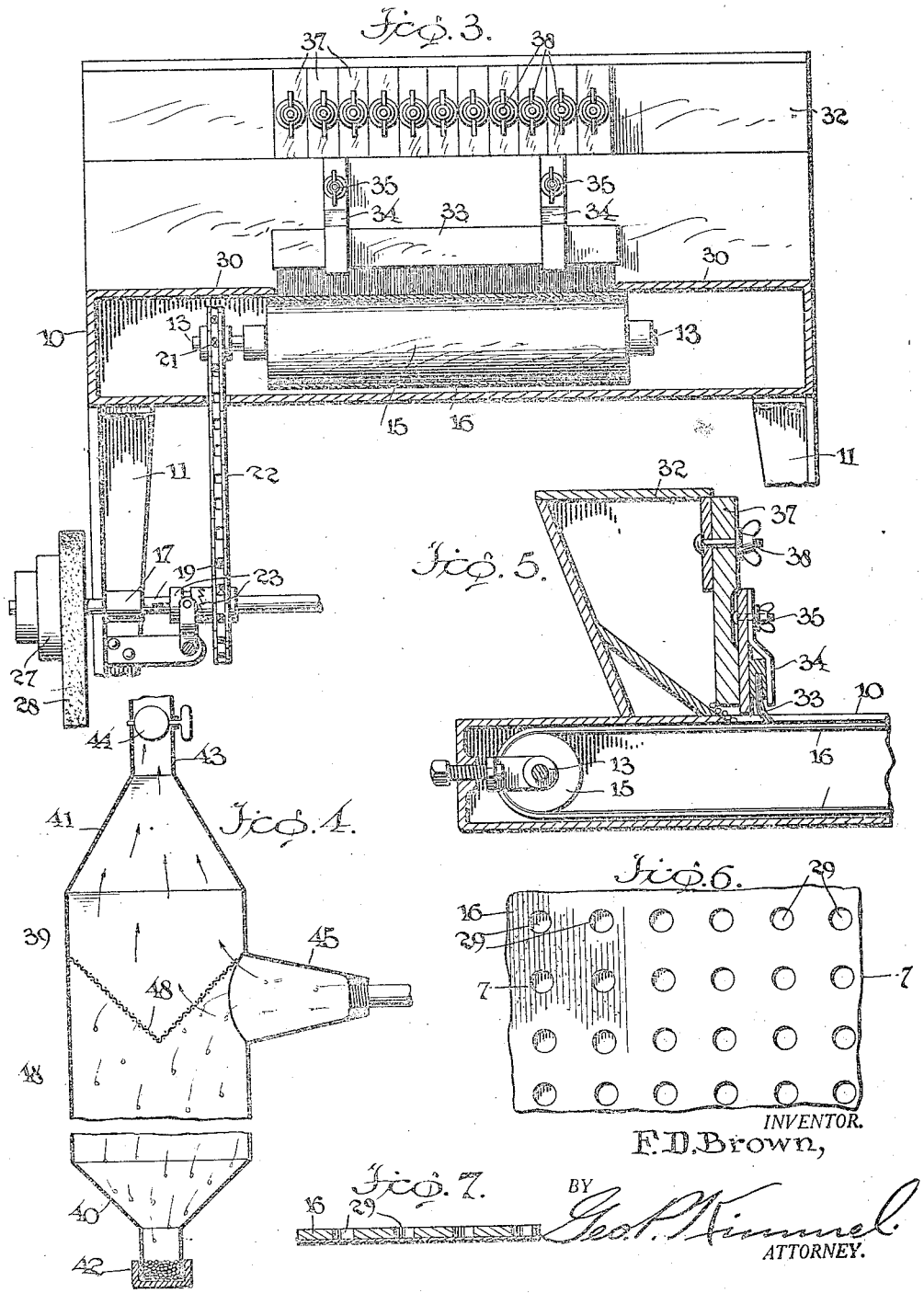
INVENTOR.
F. D. Brown,
BY
Geo. P. Kimmel
ATTORNEY.

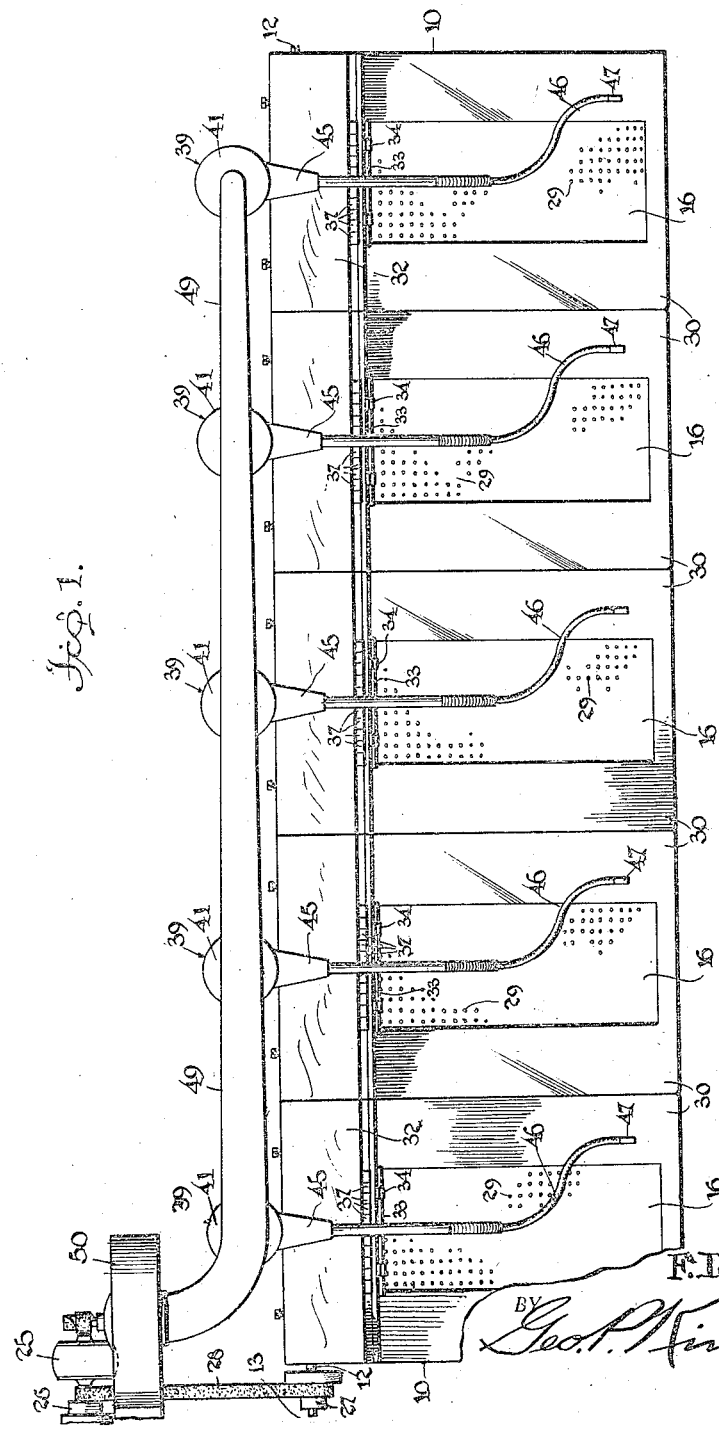

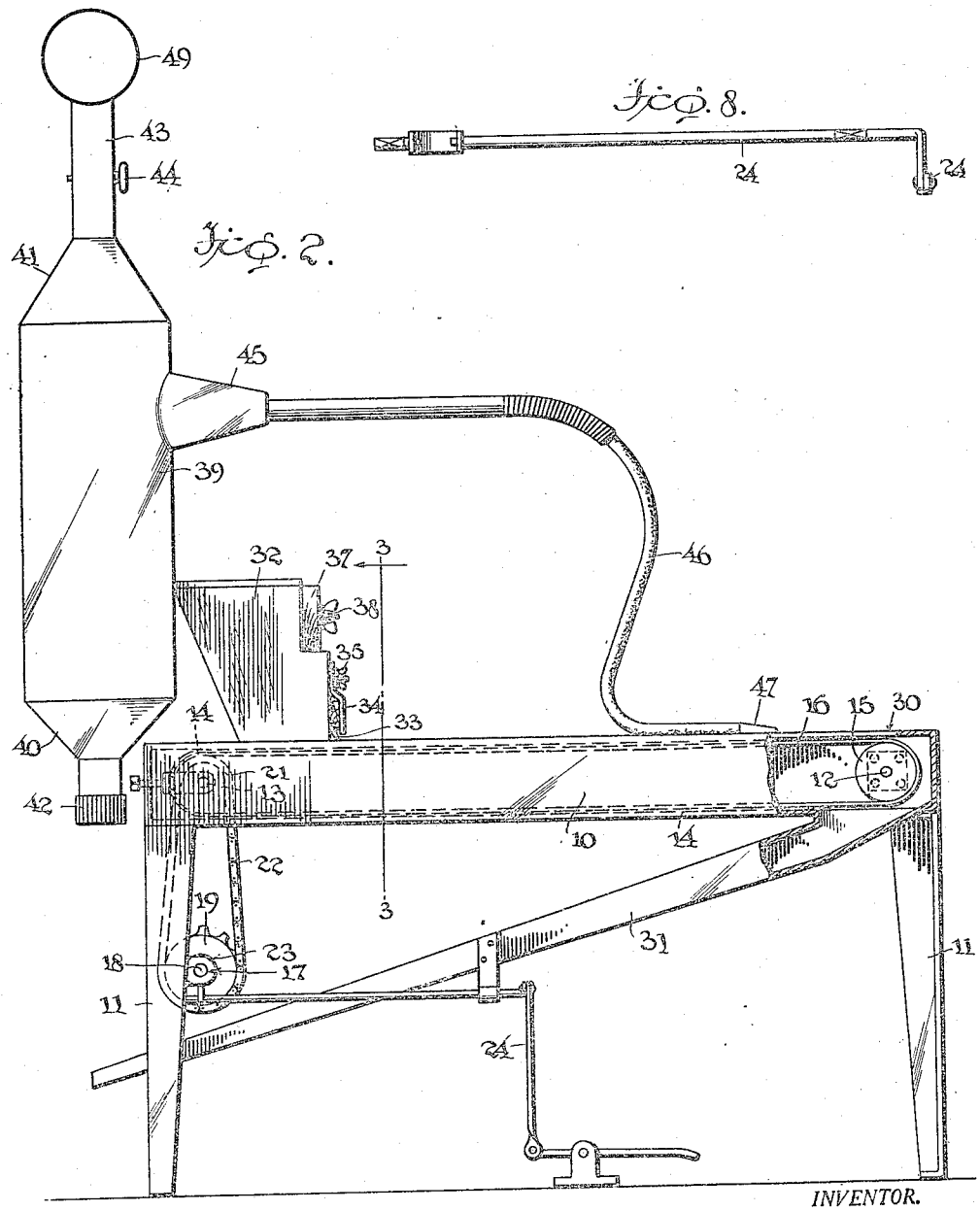

Patented Oct. 28, 1924.

1,513,482

UNITED STATES PATENT OFFICE.

FRANK D. BROWN, OF BATAVIA, NEW YORK.

PNEUMATIC CLEANER FOR BEANS AND THE LIKE.

Application filed March 20, 1924. Serial No. 700,695.

*To all whom it may concern:*

Be it known that I, FRANK D. BROWN, a citizen of the United States, residing at Batavia, in the county of Genesee and State of New York, have invented certain new and useful Improvements in Pneumatic Cleaners for Beans and the like, of which the following is a specification.

This invention relates to pneumatic cleaners for beans and the like, and has for one of its objects to provide a device of this character whereby small and imperfect kernels and foreign matter of various kinds may be separated from the perfect kernels and carried by air suction to a receptacle and the perfect and matured kernels conveyed to another receptacle.

Another object of the invention is to provide a device of this character, in which a plurality of the separating devices may be coupled to a single air trunk.

Another object of the invention is to provide a device of this character, including a plurality of the separating devices with means for controlling independently the operation of the several devices.

With these and other objects in view the invention consists in certain novel features of construction as hereinafter shown and described and then specifically pointed out in the claims, and in the drawings illustrative of the preferred embodiment of the invention—

Figure 1 is a plan view of the improved apparatus.

Figure 2 is an enlarged side elevation, partly in section.

Figure 3 is a transverse section on the line 3—3 of Figure 2, looking in the direction of the arrow.

Figure 4 is an enlarged vertical section of one of the receivers for the imperfect kernels and foreign matter.

Figure 5 is an enlarged sectional detail of one of the feed hoppers and a portion of the feed belt.

Figure 6 is a plan view of a portion of one of the feed belts.

Figure 7 is a section on the line 7—7 of Figure 6.

Figure 8 is a detail of one of the clutch operating devices.

The improved apparatus comprises in general, an endless travelling belt having a plurality of indentations or pockets each to receive a single bean or other grain, a feed hopper to contain the supply of beans, including the imperfect kernels and foreign matter, a receptacle for the imperfect kernels and foreign matter, a section of conductor hose having a terminal nozzle connected to the receptacle, and means for inducing air currents through the hose and its nozzle and the receptacle, to enable the smaller and imperfect kernels and foreign particles to be picked up and carried into the receptacle while the perfect kernels only pass over the tail or discharge end of the belt.

Any required number of the conveyor belts and receptacles may be employed and connected to one common air inducing means, but for the purpose of illustration five of the belts and five of the receptacles are shown associated with one air inducing means.

The improved apparatus, as illustrated, comprises a plurality of supporting frames in box like form and each represented as a whole at 10 and supported at a convenient height by legs 11.

Extending through each of the supporting frames near the ends are shafts 12 and 13 and carrying belt pulleys 14—15 over which endless belts 16 operate, one in each frame.

Supported from the legs 11 by brackets, one of which is shown at 17, is a counter shaft 18, carrying a plurality of chain wheels 19, one for each of the shafts 13, and running loosely on the shaft. Mounted on each of the shafts 13 and rotative therewith is another chain wheel 21, an endless chain 22 operating over each alined pair of the chain pulleys, as shown.

A clutch element, represented conventionally at 23, is mounted on the shaft 18 adjacent each of the chain wheels 19 and each arranged to be operated by a suitable treadle device one of which is represented conventionally at 24.

It will be understood that one of the sets of chain wheels and chains and one of the clutches and operating treadle devices will be arranged in connection with each of the belts 16, but one set only is shown for illustration.

The shaft 18 may be operated by any suitable power, for illustration an electric motor indicated at 25. Means should be provided for changing the speed of the shaft 18, and for illustration a cone pulley 26 is mounted on the motor shaft and a corresponding cone pulley 27 mounted on the counter shaft 18 with a belt 28 operating over the pulleys, as shown.

The conveyor belts 16 are each formed with a plurality of small depressions or pockets 29 as illustrated in Figures 6 and 7, each depression being designed to receive one kernel of the product to be separated for instance a single bean. The belt may be constructed in any suitable manner and of any suitable material, for instance of an outer portion of rubber, leather, or the like with a plurality of apertures therethrough at spaced intervals, and an inner or backing portion without perforations and forming closures or bottoms to the perforations in the outer portion. The pockets or depressions are arranged in rows transversely of the belt as shown in Figure 6.

The belts are preferably each about twenty four inches wide and the shafts 12 and 13 thirty six inches from center to center, but these dimensions may be varied as required.

The box like frame 10 is preferably so constructed that arm supports 30 are provided at each side of each of the belts 16, with the edges of the belts underlying the confronting edges of the supports, as indicated in Figure 3.

Tailing spouts, one of which is represented at 31, are supported beneath the frame 10 in position to receive the perfect beans or the like discharged from the belts, as hereafter explained.

Supported above the frame 10 near the intake ends of the belts 16 is a supply hopper represented as a whole at 32 and provided with a discharge opening opposite each of the belts, and each opening provided with a brush element 33, the head of each brush being supported by hangers 34 and each hanger adjustably coupled to the hopper 32. By this means the bristle portion of each brush may be located at any required position relative to the belts 16 to correspondingly control the flow to the belts.

The depressions or pockets 29 are arranged in rows both longitudinally and transversely of the belts 16, as shown in Figure 6 a suitable cut off device 37 is arranged for each longitudinal row of the depressions to independently cut off the flow to the pockets, the cut off devices being adjustably coupled to the hopper by clamp devices 38. By this simple means the flow of the material from the hopper can be controlled at the will of the operator. Supported in any suitable manner, preferably adjacent the frame 10 and the hopper 32, is a receptacle for the imperfect beans or the like, each receptacle comprising a cylindrical body 39, a conical bottom 40 and a conical top 41, the bottom 40 having a detachable closure 42, and the top 41 having a tubular outlet 43 with a damper device 44 therein, as shown.

Leading from each of the body portions 39 near the top, is an intake 45, and connected to each intake is a conductor hose member 46 each terminating in a nozzle device 47.

Each of the hose portions are of a sufficient length to enable the nozzle to be operated over the whole length of the belt 16 with which it is associated.

Located within each of the body portions 39 of each of the receptacles is a conical baffle member one of which is represented at 48, of screen material, to prevent the material entering through the intake 45 from passing to the outlet 43, but without cutting off the induced air currents as hereafter explained.

The outlet portions 43 are coupled to a conductor or air trunk 49, the latter leading into the eye portion of a suction fan, represented conventionally at 50.

By this means strong induced air currents may be caused to pass through the nozzles 47, conductors 46, and 45 and receptacles 39.

An operator will be located at the tail or discharge end of each of the belts 16, and as the beans or other product is discharged from the hoppers 32, the brushes 33 cause the uniform distribution so that a single bean enters each of the recesses, or pockets and the imperfect beans and smaller and imperfect beans and foreign particles, are picked off by the induced air currents passing through the nozzles and conveyed thence through the hose members 46, intake 45 and into the receptacles 39 where the air currents expand and release their grip on the particles carried through the nozzle and fall to the bottom of the receptacle, and are discharged therefrom through the conical bottom 40 when the closure 42 is detached.

The operators by moving the nozzles over the face of the belt 16 are enabled to pick out the smaller and imperfect particles, leaving the larger and perfect particles only to pass over the tails of the belts and into the discharge spouts.

The improved device is simple in construction, can be manufactured of any size or capacity, and adapted without material structural change to separate imperfect kernels and foreign matter from different kinds of grain.

By employing a separate clutch device and treadle for each of the belts 16, the latter can be individually controlled, and by manipulating the cut off devices 27 the flow can likewise be effectually controlled.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In apparatus of the class described, a moving carrier element having a plurality of indentations to receive and carry individual particles and arranged in spaced rows longitudinally of the carrier element, means for distributing the particles with one in each indentation, and means for independently cutting off the flow to each of the rows of indentations.

2. In an apparatus of the class described, a moving carrier element having a plurality of indentations to receive and carry individual particles and arranged in rows longitudinally of the carrier element, the feed hopper having a discharge communicating with said carrier element, a cut off device for each row of indentations, and a suction tube movable to any portion of the carrier element and having a terminal nozzle.

In testimony whereof, I affix my signature hereto.

FRANK D. BROWN.